(12) United States Patent
Zhang et al.

(10) Patent No.: US 11,276,178 B2
(45) Date of Patent: Mar. 15, 2022

(54) LINE SEGMENT DETECTION METHOD, APPARATUS, DEVICE, AND COMPUTER-READABLE STORAGE MEDIUM

(71) Applicant: BOE TECHNOLOGY GROUP CO., LTD., Beijing (CN)

(72) Inventors: Huanhuan Zhang, Beijing (CN); Tong Liu, Beijing (CN); Xiaojun Tang, Beijing (CN); Yifei Zhang, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 45 days.

(21) Appl. No.: 16/641,830

(22) PCT Filed: Aug. 1, 2019

(86) PCT No.: PCT/CN2019/098927
§ 371 (c)(1),
(2) Date: Feb. 25, 2020

(87) PCT Pub. No.: WO2020/042866
PCT Pub. Date: Mar. 5, 2020

(65) Prior Publication Data
US 2021/0150729 A1 May 20, 2021

(30) Foreign Application Priority Data
Aug. 30, 2018 (CN) .......................... 201811005060.7

(51) Int. Cl.
*G06T 7/13* (2017.01)
*G06T 7/187* (2017.01)
*G06T 7/90* (2017.01)

(52) U.S. Cl.
CPC ................ *G06T 7/187* (2017.01); *G06T 7/13* (2017.01); *G06T 7/90* (2017.01)

(58) Field of Classification Search
CPC .. G06T 7/00; G06T 7/13; G06T 7/187; G06T 7/90
See application file for complete search history.

(56) References Cited

U.S. PATENT DOCUMENTS

| | | | | |
|---|---|---|---|---|
| 5,991,512 A | * | 11/1999 | Shaked | ..................... H04N 1/58 358/1.9 |
| 6,778,699 B1 | * | 8/2004 | Gallagher | ............ G06K 9/4604 382/165 |

(Continued)

FOREIGN PATENT DOCUMENTS

| | | | |
|---|---|---|---|
| CN | 102496136 A | | 6/2012 |
| CN | 102750703 A | * | 10/2012 |

(Continued)

OTHER PUBLICATIONS

Topal et al. ("Edge drawing: a combined real-time edge and segment detector," Journal of Visual Communication and Image Representation, 23(6): 862-872, 2012) (Year: 012).*

(Continued)

*Primary Examiner* — Yubin Hung
(74) *Attorney, Agent, or Firm* — Leason Ellis LLP

(57) ABSTRACT

The present disclosure provides a line segment detection method, apparatus, device, and a computer-readable storage medium. Said method includes: extracting image features of an image to be processed, the image features including an image gradient angle and an image gradient amplitude; determining a plurality of seed points based on the extracted image features; for each seed point of the plurality of seed points, determining a current connected region of respective seed point according to a region growth rule, wherein the region growth rule needs to satisfy both a gradient amplitude (Continued)

growth rule and a gradient angle growth rule simultaneously; and performing line segment fitting on line segments within the current connected region of respective seed point.

16 Claims, 3 Drawing Sheets

(56) References Cited

U.S. PATENT DOCUMENTS

| | | | |
|---|---|---|---|
| 2001/0033680 A1* | 10/2001 | Bankman | G06T 7/11 |
| | | | 382/128 |
| 2001/0036222 A1* | 11/2001 | Doetsch | H04B 1/7117 |
| | | | 375/148 |
| 2005/0013486 A1* | 1/2005 | Wiedemann | G06K 9/6857 |
| | | | 382/181 |
| 2007/0024638 A1* | 2/2007 | Hoppe | G06T 3/4007 |
| | | | 345/606 |
| 2009/0322748 A1* | 12/2009 | Chen | G06T 15/08 |
| | | | 345/424 |
| 2017/0372490 A1* | 12/2017 | Kherroubi | E21B 49/00 |

FOREIGN PATENT DOCUMENTS

| | | |
|---|---|---|
| CN | 102750703 A | 10/2012 |
| CN | 103473762 A | 12/2013 |
| CN | 104657490 A | 5/2015 |
| CN | 104680506 A | 6/2015 |
| CN | 105069786 A | 11/2015 |
| CN | 105261031 A | 1/2016 |
| CN | 107273903 A | 10/2017 |
| CN | 107463939 A | 12/2017 |
| CN | 108416789 A | 8/2018 |
| WO | 2009150545 A2 | 12/2009 |

OTHER PUBLICATIONS

Wu et al. ("Line segment detection based on probability map," 36th Chinese Control Conference, Date of Conference: Jul. 26-28, 2017) (Year: 2017).*

Di Zenzo ("A note on the gradient of a multi-image," Computer Vision, Graphics, and Image Processing, 33(1): 116-125, 1986) (Year: 1986).*

Marques, Oge ("Color Image Processing," Chapter 16 of Practical Image and Video Processing Using MATLAB, Wiley-IEEE Press, 2011, pp. 387-425) (Year: 2011).*

Lee et al. ("Gradient preserving RGB-to-gray conversion using random forest," IEEE International Conference on Image Processing, Date of Conference: Sep. 27-30, 2015) (Year: 2015).*

Desolneux, Agnès ("When the a contrario approach becomes generative," International Journal of Computer Vision (116), 2016) (Year: 2016).*

Von Gioi et al. ("LSD: A Fast Line Segment Detector with a False Detection Control," IEEE Transactions on Pattern Analysis and Machine Intelligence, vol. 32, Issue: 4, Apr. 2010) (Year: 2010).*

Liu et al. ("A Line Segment Detector for SAR Images with Controlled False Alarm Rate," IEEE International Geoscience and Remote Sensing Symposium, Date of Conference: Jul. 22-27, 2018) (Year: 2018).*

Shi, Jingye, and J. Liu. "Mentation based on modified region growing algorithm." Optical Technique 43 (2017): 381-384.

Office Action issued in corresponding Chinese application No. 201811005060.7 and its English translation, dated Jan. 11, 2022. 17 Pages.

Rafael Grompone von Gioi et al. "LSD: a Line Segment Detector", Image Processing on line, Mar. 24, 2012, p. 35-55. 21 pages.

* cited by examiner

LINE SEGMENT DETECTION METHOD, APPARATUS, DEVICE, AND COMPUTER-READABLE STORAGE MEDIUM

CROSS-REFERENCE TO RELATED APPLICATIONS

This application is a U.S. National Stage Application under 35 U.S.C. § 371 of International Patent Application No. PCT/CN2019/098927, filed Aug. 1, 2019, which claims priority to Chinese patent application with the application No. 201811005060.7, filed on Aug. 30, 2018 in China, both of which are incorporated by reference herein in their entireties as part of the present disclosure.

TECHNICAL FIELD

The present disclosure relates to the field of image processing, and more particularly, to a line segment detection method, apparatus, device, and a computer-readable storage medium.

BACKGROUND

According to the visual computing theory, recognition of an object by the human eye must first obtain its contour, when imitating the human visual to recognize a target in an image, the computer vision system must first obtain a feature map representing an edge contour of the target. A line segment is a straight line connecting two endpoints, a line segment in a digital image is composed of line segment primitives connected to each other, which have simple geometric features and good geometric resolution, thus the line segment is a way to describe the edge features of the target. For many computer vision systems, the accuracy of line segment feature extraction directly affects the success or failure of subsequent image processing steps such as object recognition, stereo matching, and target tracking.

SUMMARY

According to an aspect of the present disclosure, there is provided a line segment detection method, comprising: extracting image features of an image to be processed, the image features including an image gradient angle and an image gradient amplitude; determining a plurality of seed points based on the extracted image features; for each seed point of the plurality of seed points, determining a current connected region of respective seed point according to a region growth rule, wherein the region growth rule needs to satisfy both a gradient amplitude growth rule and a gradient angle growth rule simultaneously; and performing line segment fitting on line segments within the current connected region of respective seed point.

According to an aspect of the present disclosure, there is provided a line segment detection apparatus, comprising: an image feature extraction unit configured to extract image features of an image to be processed, the image features including an image gradient angle and an image gradient amplitude; a seed point determination unit configured to determine a plurality of seed points based on the extracted image features; the region growth rule determination unit configured to determine, for each seed point of the plurality of seed points, a current connected region of respective seed point according to a region growth rule, wherein the region growth rule needs to satisfy both a gradient amplitude growth rule and a gradient angle growth rule simultaneously; and a line segment fitting unit configured to perform line segment fitting on line segments within the current connected region of respective seed point.

According to an aspect of the present disclosure, there is provided a line segment detection device, comprising: a memory configured to store computer-readable instructions; and a processor configured to process the computer-readable instructions stored in the memory, wherein the following functions are executed when the processor processes the computer-readable instructions: extracting image features of an image to be processed, the image features including an image gradient angle and an image gradient amplitude; determining a plurality of seed points based on the extracted image features; for each seed point of the plurality of seed points, determining a current connected region of respective seed point according to a region growth rule, wherein the region growth rule needs to satisfy both a gradient amplitude growth rule and a gradient angle growth rule simultaneously; and performing line segment fitting on line segments within the current connected region of respective seed point.

In the above aspects of the present disclosure, image feature extraction is performed based on an image gradient fusion method, which can better highlight edge regions, provide good feature input for subsequent algorithms, and thereby achieve the purpose of reducing line segment detection leakage. In addition, most of the seed points filtered by the threshold belong to pixels of a strong edge region, which provides a good starting point for subsequent region growth, can reduce the generation of false line segments to a certain extent, and reduce the calculation amount for growth of the connected region.

BRIEF DESCRIPTION OF THE DRAWINGS

The above and other objectives, features, and advantages of the present disclosure will become more apparent by describing the embodiments of the present disclosure in more detail with reference to the accompanying drawings. The drawings can provide a further understanding of the embodiments of the present disclosure, and constitute a part of the specification, which can be used to explain the present disclosure together with the embodiments thereof, and do not constitute a limitation to the present disclosure. In the drawings, the same reference numerals generally represent the same components or steps.

DETAILED DESCRIPTION OF THE EMBODIMENTS

The technical solutions in the embodiments of the present disclosure will be clearly and completely described below with reference to the accompanying drawings in the embodiments thereof. Obviously, the described embodiments are only a part of the embodiments of the present disclosure, not all of the embodiments. All other embodiments obtained by a person skilled in the art based on the embodiments in the present disclosure without creative effort belong to the protection scope of the present disclosure.

The present disclosure provides a method for detecting line segments in a digital image. In order to more comprehensively highlight local brightness or color change of an image, the present disclosure extracts features of the image by fusing gradient features of three color channels of a chromatic image and gradient features of its grayscale image information. Since one line segment corresponds to one connected region with approximately equal gradient amplitudes and approximately consistent gradient directions, the present disclosure provides, based on the gradient features of the pixels to which the edge of the line segment belongs, a connected region growing method based on gradient consistency and using both the gradient angle and the gradient amplitude simultaneously. After growth of the connected region, the present disclosure can also perform region revision on the connected region. After the region revision, the present disclosure proposes a line segment fitting method using effective pixels having non-maximum image gradient within the connected region, and determines whether the line segment fitting result is valid by calculating the number of false line segments in the image.

First, a line segment detection method for implementing an embodiment of the present disclosure is described with reference to FIG. 1. The method can be executed by a computer.

Figure 1:
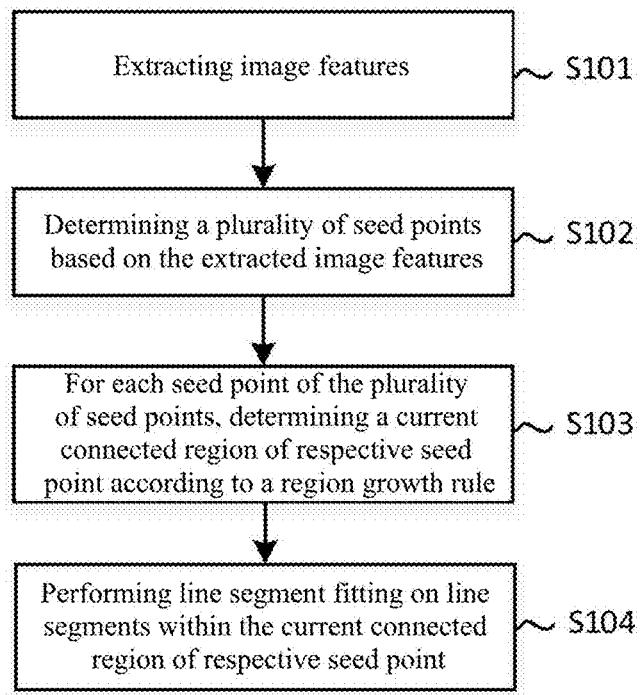
FIG. 1 is a flowchart of a line segment detection method according to an embodiment of the present disclosure.

As shown in FIG. 1, in step S101, image features of an image to be processed are extracted.

The image may be a chromatic image or a grayscale image. The image features include an image gradient angle and an image gradient amplitude. Image gradient is a vector indicating that a directional derivative of an image function at this point takes a maximum value along this direction, wherein the gradient direction (gradient angle) is the direction in which the direction derivative takes the maximum value, and the modulus of the gradient (gradient amplitude) is a change rate of the function in the gradient direction.

Figure 2:
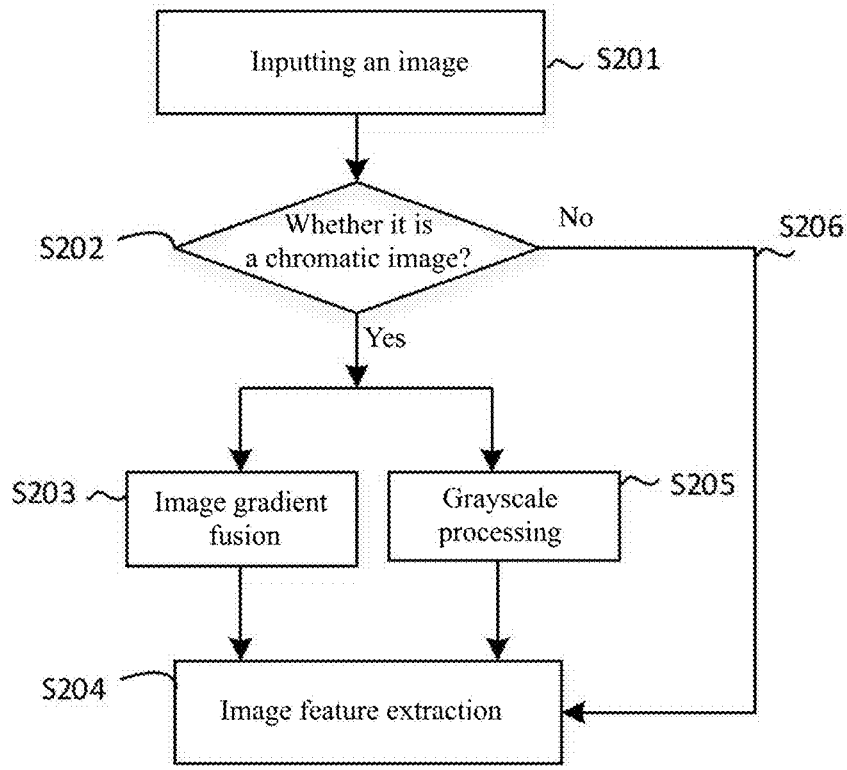
FIG. 2 is a flowchart of extracting image features of an image to be processed according to an embodiment of the present disclosure.

FIG. 2 is a flowchart of extracting image features of an image to be processed according to an embodiment of the present disclosure. As shown in FIG. 2, first, an image is inputted (S201), then it is determined whether the inputted image is a chromatic image (S201). When the image is a chromatic image, the gradient angle value and the gradient amplitude value can be extracted based on an image gradient fusion method (S203) as the image features (S204), or the chromatic image may be subjected to grayscale processing (S205), then the gradient angle value and the gradient amplitude value after grayscale processing is performed on the image are directly extracted as the image features (S204). Alternatively, when the image is not a chromatic image (for example, the image is a grayscale image), the gradient angle value and the gradient amplitude value of the image are directly extracted as the image features (S206).

Steps of the method for extracting the gradient angle value and the gradient amplitude value as image features based on the image gradient fusion method (S203 in FIG. 2) when the image is a chromatic image are described below.

Here, the gradient fusion method of a chromatic image is: first, performing grayscale processing on the chromatic image to extract the grayscale channel gradient amplitude having been grayscale processed; next, extracting amplitudes of the red channel gradient, the green channel gradient, and the blue channel gradient of the chromatic image; then taking the maximum value from among the amplitudes of the red channel gradient, the green channel gradient, the blue channel gradient, and the grayscale channel gradient as the fused chromatic image gradient amplitude; and extracting the gradient angle corresponding to the fused chromatic image gradient amplitude as the gradient angle of the fused chromatic image.

Here, the RGB color mode is a color standard in the industry, various colors are obtained by changing the three color channels of red (R), green (G), and blue (B) and superimposing them on each other, RGB represents the color of the three channels of red, green and blue. The red channel gradient represents the obtained gradient of the red channel image, including the gradient amplitude and the gradient angle; the green channel gradient represents the obtained gradient of the green channel image, including the gradient amplitude and the gradient angle; the blue channel gradient represents the obtained gradient of the blue channel image, including gradient amplitude and gradient angle.

The red channel gradient, the green channel gradient, and the blue channel gradient of the chromatic image reflect the local change of the image color, and the gradient of the grayscale image of the chromatic image reflects the local change of the image brightness. For example, a gradient fusion method can be adopted to extract chromatic image features, that is, feature extraction is performed by fusing the gradient of the three channels of the chromatic image (red channel gradient, green channel gradient, and blue channel gradient) and the grayscale image after grayscale processing is performed on the chromatic image, so that edge regions can be better highlighted, which provides good feature input for subsequent algorithms, and then achieves the purpose of reducing line segment detection leakage.

For example, assuming that the gradient amplitude and gradient angle of the red channel of the pixel (x, y) in the chromatic image are $G_r(x, y)$ and $\theta_r(x, y)$ respectively, the gradient amplitude and gradient angle of the green channel are $G_g(x, y)$ and $\theta_g(x, y)$ respectively, the gradient amplitude and gradient angle of the blue channel are $G_b(x, y)$ and $\theta_b(x, y)$ respectively, and the gradient amplitude and gradient angle of the grayscale channel after the grayscale processing are $G_{gray}(x, y)$ and $\theta_{gray}(x, y)$ respectively, the gradient amplitude after the chromatic image gradient fusion is the maximum value of the respective image gradient amplitudes, that is:

$$G_{fusion}(x, y) = \max\{G_r(x, y), G_g(x, y), G_b(x, y), G_{gray}(x, y)\}$$

the gradient angle after the chromatic image gradient fusion is the gradient angle corresponding to the maximum value of the gradient amplitude, that is:

$$\theta_{fusion}(x, y) = \theta_{G_{fusion}(x,y)}$$

The fused chromatic image gradient amplitude comprehensively reflects the changes in color and brightness, the fused chromatic image gradient angle is more consistent in the region of color or brightness change, thereby the representability ability of edge features is improved and line segment detection leakage is effectively reduced.

After description is provided for that the gradient angle value and the gradient amplitude value are extracted as image features based on the image gradient fusion method when the image is a chromatic image, alternatively, the chromatic image can also be subjected to grayscale processing (S205 in FIG. 2) and the gradient angle value and gradient amplitude value after grayscale processing is performed on the image are extracted directly as the image features.

For example, assuming that the gradient amplitude and gradient angle of the grayscale channel after grayscale processing is performed on the image are $G_{gray}(x, y)$ and $\theta_{gray}(x, y)$ respectively, the gradient amplitude and gradient angle of $G_{gray}(x, y)$ and $\theta_{gray}(x, y)$ are directly extracted as the image features.

Alternatively, when the image is not a chromatic image (for example, the image is a grayscale image), the gradient angle value and the gradient amplitude value of the image are directly extracted as the image features (S206 in FIG. 2). Next, returning to FIG. 1, in step S102, a plurality of seed points is determined based on the extracted image features.

Determining a plurality of seed points based on the extracted image features may comprise: determining a plurality of seed points based on the extracted image features through non-maximum suppression and threshold filtering.

The image gradient reflects the sharp and continuous change of the image color or brightness. The non-maximum suppression of the image gradient is the non-maximum suppression of the image gradient amplitude along the image gradient direction, so the effective pixels after the image gradient non-maximum suppression is performed are candidate points for the edge of the line segment, here, it can be considered as candidate points for the seed points for growth of the connected region.

For example, the non-maximum suppression formula for image gradient is as follows, that is, if the gradient amplitude of a current pixel is larger than the gradient amplitude of both two adjacent pixels in the gradient direction, the current point gradient amplitude is retained, otherwise the current point is suppressed:

$$G_{NMS}(x, y) = \begin{cases} G(x, y), & G(x, y) > G_\theta(x, y)_1 \text{ and } G(x, y) > G_\theta(x, y)_2 \\ 0, & \text{Other cases} \end{cases}$$

wherein $G_{NMS}(x, y)$ represents the effective pixel gradient after the image gradient is subjected to non-maximum suppression, $G(x, y)$ represents the image gradient amplitude of the pixel (x, y), $G_\theta(x, y)_1$ and $G_\theta(x, y)_2$ represent the gradient amplitudes of two pixels adjacent to the current pixel in the image gradient direction respectively. That is, if the gradient amplitude $G(x, y)$ of the current pixel (x, y) is larger than the gradient amplitude ($G_\theta(x, y)_1$ and $G_\theta(x, y)_2$) of both two adjacent pixels in the gradient direction, the current point gradient amplitude is retained, otherwise the current point is suppressed.

After a plurality of effective pixel gradients are determined through non-maximum suppression, next, a plurality of seed points are determined through threshold filtering. The process of determining a plurality of seed points through threshold filtering is described below.

In the present disclosure, a difference between a statistical average value of the gradient amplitude of the image and a standard deviation of the image gradient at a preset multiple is taken as a threshold. Here, a 0.2 multiple is used as an example. All effective pixel points whose effective pixel gradient after the image gradient has been subjected to non-maximum suppression is greater than the threshold are used as seed points for growth of the connected region, and all pixel points with gradient amplitudes greater than a sum of the statistical average of the gradient amplitude of the image and the standard deviation of the image gradient are used as seed points for growth of the connected region, as shown in the following formula:

$P_{seed}(x, y) = \{\{P(x, y) \mid G_{NMS}(x, y) > threshold_{seed1}\}$ $\qquad\qquad\qquad\qquad U\{P(x, y) \mid G(x, y) > threshold_{seed2}\}\}$ wherein $threshold_{seed1} = aveMag - 0.2\, stdMag$ $threshold_{seed2} = aveMag + stdMag$ $aveMag = (1/N)\sum G(x, y)$ $stdMag = sqrt\sqrt{(1/N)\sum(G(x, y) - aveMag)^2}$ wherein $P_{seed}(x, y)$ represents a set of seed points, $P(x, y)$ represents an image pixel, $G(x, y)$ represents the image gradient amplitude of the pixel (x, y), N is the number of image pixels, $G_{NMS}(x, y)$ represents the effective pixel gradient after the image gradient has been subjected to non-maximum suppression, aveMag represents the statistical average value of the gradient amplitude, stdMag represents the standard deviation of the image gradient.

As mentioned above, there are many effective pixels after the image gradient is subjected to non-maximum suppression, some belong to strong edge regions, but most of them are weak edges or noise regions, the pixels of the strong edge regions have a relatively large gradient amplitude, the pixels of the weak edge regions have a relatively small gradient amplitude. Most of the seed points which have been subjected to threshold filtering belong to the pixels of the strong edge region, which provides a good starting point for subsequent region growth, which can reduce the generation of false line segments to a certain extent, and reduce the calculation amount for growth of the connected region.

Next, continuing to return to FIG. 1. In step S103, for each seed point of the plurality of seed points, the current connected region of respective seed point is determined according to the region growth rule, wherein the region growth rule needs to satisfy both a gradient amplitude growth rule and a gradient angle growth rule simultaneously.

Here, for each seed point of the plurality of seed points, determining the current connected region of respective seed point according to the region growth rule may comprise: selecting a seed point as an initial growing point in an order of the gradient amplitude from large to small; for each initial growing point, adding other seed points that satisfy the region growth rule to the initial connected region of the seed point as the current connected region.

The larger the gradient amplitude is, the more obvious the brightness or color change of the image is, and the more likely it is the edge region of the image. Since the region growth algorithm is a greedy algorithm, and selection of the seed points will affect a result of the region growth, thus in the present disclosure, when the region grows, the seed points are selected as the initial growing points in an order of the gradient amplitude from large to small, which is beneficial to reduce the generation of false line segments.

The pixels in the connected region have similar gradient directions and similar gradient amplitudes, the present disclosure provides a connected region growth rule that needs to satisfy both the gradient amplitude growth rule and the gradient angle growth rule simultaneously.

The gradient amplitude growth rule is: sorting amplitudes of neighborhood pixels of each initial growing point, and selecting the pixels whose amplitudes are ranked at a predetermined order as the pixels that satisfy the gradient amplitude growth rule. For example, the gradient amplitudes of the eight neighborhood pixels of the current growing point are sorted. If the gradient amplitude of a certain one of the eight neighborhood pixels is ranked in the top four, the pixel satisfies the gradient amplitude growth rule. It should be recognized that the aforesaid predetermined rank is only an example, and the aforesaid predetermined rank can be set as required.

The gradient angle growth rule is: selecting pixels that are not added to the current connected region as pixels to be determined, selecting pixels to be determined an absolute value of a difference between whose gradient angle and the gradient angle of the current connected region is less than a predetermined value as pixels that satisfy the gradient angle growth rule. For example, the image gradient angle growth rule is the same as the LSD (Line Segment Detector) line extraction algorithm, that is, if the absolute value of the difference between the gradient angle of the pixel to be determined and the gradient angle of the growing region is less than 22.5 degrees, it satisfies the gradient angle growth rule. It should be recognized that the aforesaid gradient angle difference is just an example, and the aforesaid gradient angle difference can be set as required.

Further, after determining the current connected region of respective seed point according to the region growth rule, region revision may be performed on the current connected region, and the region revision comprises: comparing a proportion of pixels within the connected region to pixels of its circumscribed rectangle with a set proportion threshold. If the proportion of pixels within the connected region to pixels of its circumscribed rectangle is less than the set proportion threshold, the region growth is restarted by reducing an image gradient angle threshold or reducing a side length of the circumscribed rectangle.

For example, by comparing the proportion of pixels in the connected region to pixels of its circumscribed rectangle with a set proportion threshold (for example, 0.6), it can be determined whether the connected region is valid. If the proportion of pixels in the connected region to pixels of its circumscribed rectangle is greater than the set proportion threshold, the connected region is valid, otherwise it is invalid. If it is invalid, it needs to reduce the gradient angle threshold of the image or reduce the side length of the circumscribed rectangle, and then restart the region growth to achieve region revision.

Next, returning to FIG. 1, in step S104, line segment fitting is performed on line segments in the current connected region of respective seed point.

The pixels in the connected region have gradient consistency, and the effective pixels having non-maximum image gradient being suppressed are candidate points for the edges, the line segments fitted by them are closer to the true line segment edges of the image, therefore, a connected region line segment fitting algorithm is provided by the present disclosure. First, the effective pixels having non-maximum image gradient being suppressed are utilized to fit the lines to which the line segments belong, and then the two endpoints of the fitted line segments are determined in connection with the image coordinate information of the pixels in the connected region, so as to determine the fitted line segments.

Specifically, the image coordinates of the effective pixels having non-maximum image gradient being suppressed within the connected region are considered as the input of line fitting of lines to which the line segments belong, and then the least square method is adopted to fit the lines to which the lines segments belong. Next, the two endpoints of the line segments are determined according to the maximum and minimum values of the image coordinates of the pixels in the connected region, and a line segment detection result is obtained. Next, it is verified whether the line segment detection result is valid.

After determining the fitted line segments, whether the line segment fitting result is valid may be determined by calculating the number of false line segments in the image, that is, after line segment fitting is performed on the line segments within the current connected region of the respective seed point, the following steps are further comprised: calculating the number of false line segments in the image, and selecting a line segment fitting result in which number of false line segments is less than a preset threshold as a valid result.

For example, the following method can be adopted to verify whether the line segment detection result is valid. For a line segment fitted by n seed points, the distance from each seed point to the line segment is calculated, and the number of seed point pixels whose distance is less than a predetermined value (for example, 1.5 pixels) is counted, and then number of false line segments (NFA) in the image is calculated based on the line segment.

For example, assuming that L is a line segment fitted by n seed points, and the distance from at least x seed points to the fitted line segment is less than 1.5, then NFA is defined as $$NFA(L, x) = (M \times N)^2 \sum_{i=x}^{n} \binom{n}{i} p^i (1-p)^{n-i}$$

wherein $(M \times N)^2$ represents the number of potential line segments in an image of $(M \times N)$ size. Since the line segment has two endpoints, and each endpoint can be located anywhere in the image, the total number of line segments is $(M \times N)^2$. Assuming that a width of the outer rectangle of the connected region is width, then the probability p represents the probability that a seed point is not a line segment fitting error point, p=3/width.

If NFA (L, x)≤ε, the line segment detection result is valid; otherwise, the line segment detection result is invalid, wherein ε can be set to 1, that is, an error detection result is allowed in an image. It can be understood that ε can also be set to other values, and the value set for ε is only an example here.

Figure 3:
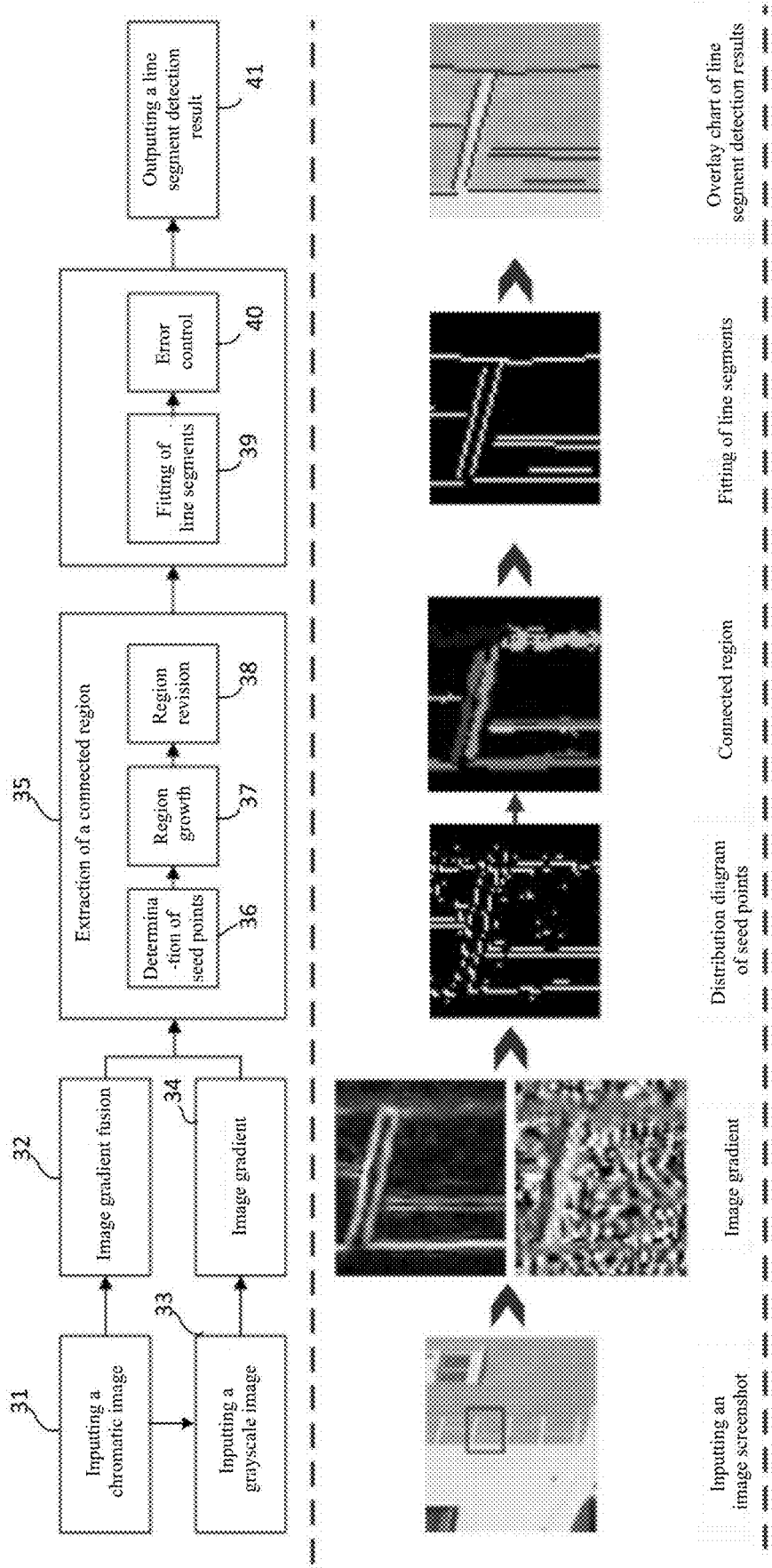
FIG. 3 is a schematic diagram of a line segment detection method according to an embodiment of the present disclosure.

A line segment detection method according to an embodiment of the present disclosure will be described below with reference to FIG. 3. FIG. 3 is a schematic diagram of a line segment detection method according to an embodiment of the present disclosure.

The present disclosure provides a method for detecting line segments in a digital image. For the inputted image, the image features of the image to be processed are first extracted, wherein the image features include the image gradient angle and the image gradient amplitude. When the input image is a chromatic image 31, extraction may be performed based on the method of image gradient fusion 32, or the chromatic image can be subjected to grayscale processing and converted into a grayscale image 33, and then the gradient angle value and gradient amplitude value (for example, image gradient 34) are extracted directly as the image features. When the input image is a grayscale image 33, features of the image (for example, image gradient 34) are directly extracted. After the features of the image are extracted, extraction of the connected region 35 is performed. As shown in the figure, extraction of the connected region includes three aspects: first, based on the extracted image features, seed points 36 are selected according to non-maximum suppression and threshold filtering; next, region growth 37 is performed, that is, selecting a seed point as an initial growing point in an order from a large gradient amplitude to a small gradient amplitude; for each initial growing point, adding other seed points that satisfy the region growth rule to the initial connected region of the seed point as the current connected region, wherein the region growth rule needs to satisfy the gradient amplitude growth rule and the gradient angle growth rule simultaneously; then, after the current connected region of respective seed point is determined according to the region growth rule, the current connected region can be subjected to region revision 38. After the connected region extraction 35, line segment fitting 39 can be performed on the line segments in the connected region. The line segment fitting includes utilizing the effective pixels having non-maximum image gradient being suppressed to fit the lines to which the line segments belong, and then the two endpoints of the fitted line segments are determined in connection with the image coordinate information of the pixels in the connected region, so as to determine the fitted line segments After determining the fitted line segments, error control 40 is adopted to determine whether the line segment fitting result is valid, that is, the number of false line segments in the image can be calculated to determine whether the line segment fitting result is valid. Finally, the line segment detection result 41 is outputted.

It can be seen that, in the above aspect of the present disclosure, by performing image feature extraction based on an image gradient fusion method, edge regions can be better highlighted, good feature input can be provided for subsequent algorithms, and the purpose of reducing line segment detection leakage can be achieved. In addition, most of the seed points filtered by the threshold belong to the pixels in the strong edge region, which provides a good starting point for subsequent region growth, can reduce the generation of false line segments to a certain extent, and reduce the calculation amount for growth of connected regions. Further, in the region growing, the seed points are selected as the initial growing points in an order from a large gradient amplitude to a small gradient amplitude, in order to reduce the occurrence of false line segments.

Figures 4, 5:
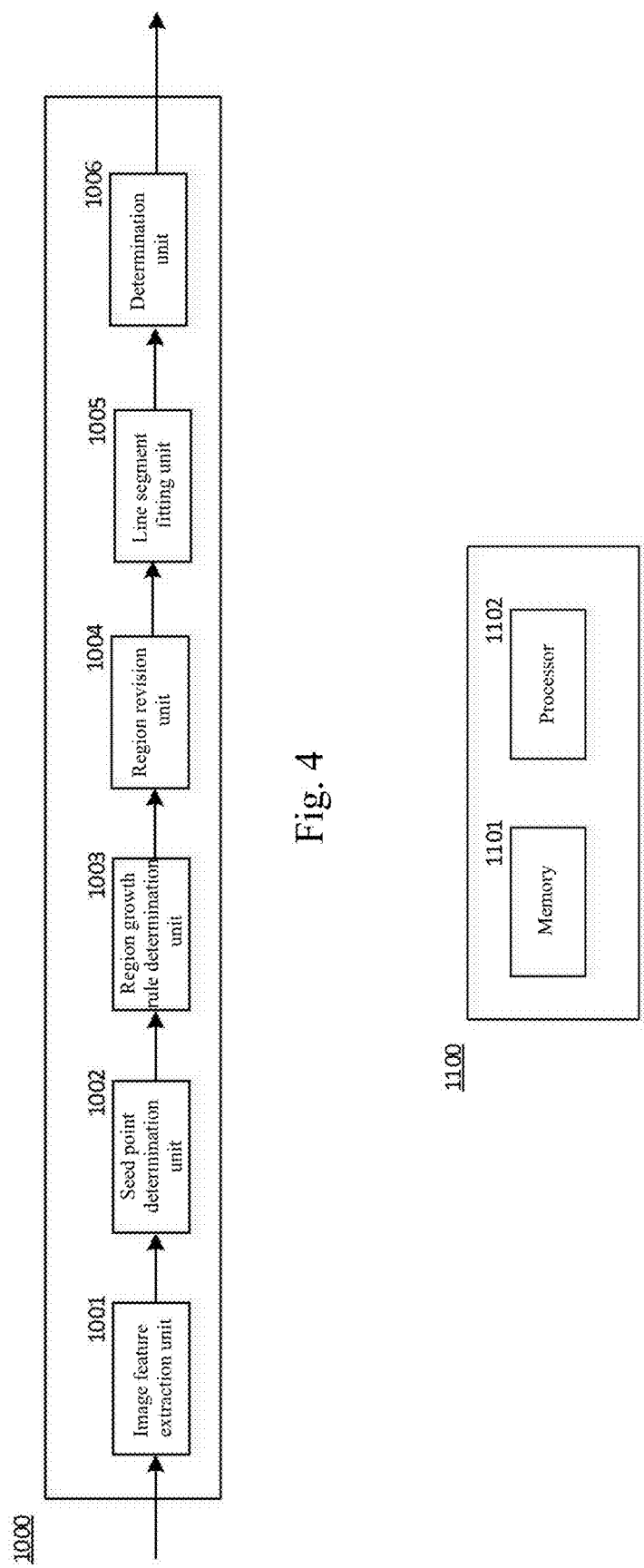
FIG. 4 is a schematic diagram of a line segment detection apparatus according to an embodiment of the present disclosure.
FIG. 5 is a schematic diagram of a line segment detection device according to an embodiment of the present disclosure.

Hereinafter, a line segment detection apparatus according to an embodiment of the present disclosure will be described with reference to FIG. 4. FIG. 4 is a schematic diagram of a line segment detection apparatus according to an embodiment of the present disclosure. Since the function of the line segment detection apparatus of this embodiment is the same as the details of the method described above with reference to FIG. 1, detailed description of the same content is omitted here for simplicity.

As shown in FIG. 4, the line segment detection apparatus 1000 comprises an image feature extraction unit 1001, a seed point determination unit 1002, a region growth rule determination unit 1003, a region revision unit 1004, a line segment fitting unit 1005, and a determination unit 1006. It should be noted that although the line segment detection apparatus 1000 is shown in FIG. 4 as including only 6 units, this is only schematic, the line segment detection apparatus 1000 may also include one or more other units, these units are unrelated to the inventive concept, so they are omitted here.

The image feature extraction unit 1001 may extract image features of an image to be processed.

The image may be a chromatic image or a grayscale image. The image features may include an image gradient angle and an image gradient amplitude.

Here, when the image is a chromatic image, the gradient angle value and the gradient amplitude value can be extracted as image features based on the image gradient fusion method, or the chromatic image can be subjected to grayscale processing, and then the gradient angle value and gradient amplitude value after grayscale processing is performed are directly extracted as the image features. Alternatively, when the image is a grayscale image, the gradient angle value and the gradient amplitude value of the image are directly extracted as the image features.

Steps of the method for extracting the gradient angle value and the gradient amplitude value as image features based on the image gradient fusion method when the image is a chromatic image are described below.

Here, the gradient fusion method of a chromatic image is: first, performing grayscale processing on the chromatic image to extract the grayscale channel gradient amplitude after grayscale processing is performed; next, extracting amplitudes of the red channel gradient, the green channel gradient, and the blue channel gradient of the chromatic image; then taking the maximum value from among the amplitudes of the red channel gradient, the green channel gradient, the blue channel gradient, and the grayscale channel gradient as the fused chromatic image gradient amplitude; and extracting the gradient angle corresponding to the fused chromatic image gradient amplitude as the gradient angle of the fused chromatic image. The red channel gradient, the green channel gradient, and the blue channel gradient of the chromatic image reflect the local change of the image color, and the gradient of the grayscale image of the chromatic image reflects the local change of the image brightness. For example, a gradient fusion method can be adopted to extract chromatic image features, that is, feature extraction is performed by fusing the gradient of the three channels of the chromatic image (red channel gradient, green channel gradient, and blue channel gradient) and the grayscale image after grayscale processing is performed on the chromatic image, so that the edge regions can be better highlighted, which provides good feature input for subsequent algorithms, and then achieves the purpose of reducing line segment detection leakage.

For example, assuming that the gradient amplitude and gradient angle of the red channel of the pixel (x, y) in the chromatic image are $G_r(x, y)$ and $\theta_r(x, y)$ respectively, the gradient amplitude and gradient angle of the green channel are $G_g(x, y)$ and $\theta_g(x, y)$ respectively, the gradient amplitude and gradient angle of the blue channel are $G_b(x, y)$ and $\theta_b(x, y)$ respectively, and the gradient amplitude and gradient angle of the grayscale channel which have been grayscale processed are $G_{gray}(x, y)$ and $\theta_{gray}(x, y)$ respectively, the gradient amplitude after gradient fusion of the chromatic image is the maximum value of the gradient amplitude of each image, that is:

$$G_{fusion}(x, y) = \max\{G_r(x, y), G_g(x, y), G_b(x, y), G_{gray}(x, y)\}$$

the gradient angle after gradient fusion of the chromatic image is the gradient angle corresponding to the maximum value of the gradient amplitude, that is:

$$\theta_{fusion}(x, y) = \theta_{G_{fusion}(x,y)}$$

The fused chromatic image gradient amplitude comprehensively reflects the changes in color and brightness, the fused chromatic image gradient angle is more consistent in the region of color or brightness change, thereby the representability ability of edge features is improved and line segment detection leakage is effectively reduced.

After description is provided for that the gradient angle value and the gradient amplitude value are extracted as image features based on the image gradient fusion method when the image is a chromatic image, alternatively, the chromatic image can also be subjected to grayscale processing, and the gradient angle value and gradient amplitude value after grayscale processing is performed on the image are extracted as the image features directly.

For example, assuming that the gradient amplitude and gradient angle of the grayscale channel after the image is subjected to grayscale processing are $G_{gray}(x, y)$ and $\theta_{gray}(x, y)$ respectively, the gradient amplitude and gradient angle of $G_{gray}(x, y)$ and $\theta_{gray}(x, y)$ are directly extracted as image features.

Alternatively, when the image is not a chromatic image (for example, the image is a grayscale image), the gradient angle value and the gradient amplitude value of the image are directly extracted as the image features.

Next, the seed point determination unit 1002 may determine a plurality of seed points based on the extracted image features.

Here, the seed point determination unit 1002 determines a plurality of seed points through non-maximum value suppression and threshold filtering based on the extracted image features.

The image gradient reflects the sharp and continuous change of the image color or brightness. The non-maximum suppression of the image gradient is the non-maximum suppression of the image gradient amplitude along the image gradient direction, so the effective pixels after the image gradient non-maximum suppression is performed are candidate points for the edge of the line segment, here, it can be considered as candidate points for the seed points for growth of the connected region.

For example, the non-maximum suppression formula for image gradient is as follows, that is, if the gradient amplitude of a current pixel is larger than the gradient amplitude of both two adjacent pixels in the gradient direction, the current point gradient amplitude is retained, otherwise the current point is suppressed:

$$G_{NMS}(x, y) = \begin{cases} G(x, y), & G(x, y) > G_\theta(x, y)_1 \text{ and } G(x, y) > G_\theta(x, y)_2 \\ 0, & \text{Other cases} \end{cases}$$

wherein $G_{NMS}(x, y)$ represents the effective pixel gradient after the image gradient is subjected to non-maximum suppression, $G(x, y)$ represents the image gradient amplitude of the pixel (x, y), $G_\theta(x, y)_1$ and $G_\theta(x, y)_2$ represent the gradient amplitudes of two pixels adjacent to the current pixel in the image gradient direction respectively. That is, if the gradient amplitude $G(x, y)$ of the current pixel (x, y) is larger than the gradient amplitude $(G_\theta(x, y)_1$ and $G_\theta(x, y)_2)$ of both two adjacent pixels in the gradient direction, the current point gradient amplitude is retained, otherwise the current point is suppressed.

After a plurality of effective pixel gradients are determined through non-maximum suppression, next, a plurality of seed points are determined through threshold filtering. The process of determining a plurality of seed points through threshold filtering is described below.

In the present disclosure, a difference between a statistical average value of the gradient amplitude of the image and a standard deviation of the image gradient at a 0.2 multiple is taken a threshold. All effective pixel points whose effective pixel gradient after the image gradient has been subjected to non-maximum suppression is greater than the threshold are considered as seed points for growth of the connected region, and all pixel points with gradient amplitudes greater than a sum of the statistical average of the gradient amplitude of the image and the standard deviation of the image gradient are considered as seed points for growth of the connected region, as shown in the following formula:

$$P_{seed}(x, y) = \{\{P(x, y) \mid G_{NMS}(x, y) > threshold_{seed1}\}$$
$$\cup \{P(x, y) \mid G(x, y) > threshold_{seed2}\}\}$$

wherein $threshold_{seed1} = aveMag - 0.2\, stdmag$ $threshold_{seed2} = aveMag + stdmag$ $aveMag = (1/N) \sum G(x, y)$ $stdMag = sqrt\sqrt{(1/N)\sum G(x, y) - aveMag)^2}$ wherein $P_{seed}(x, y)$ represents a set of seed points, P (x, y) represents an image pixel, G(x, y) represents the image gradient amplitude of the pixel (x, y), N is the number of image pixels, $G_{NMS}(x, y)$ represents the effective pixel gradient after the image gradient has been subjected to non-maximum suppression, aveMag represents the statistical average value of the gradient amplitude, stdMag represents the standard deviation of the image gradient.

As mentioned above, there are many effective pixels after the image gradient is subjected to non-maximum suppression, some belong to strong edge regions, but most of them are weak edges or noise regions, the pixels of the strong edge regions have a relatively large gradient amplitude, the pixels of the weak edge regions have a relatively small gradient amplitude. Most of the seed points which have been subjected to threshold filtering belong to the pixels of the strong edge region, which provides a good starting point for subsequent region growth, which can reduce the generation of false line segments to a certain extent, and reduce the calculation amount for growth of the connected region.

Next, the region growth rule determination unit 1003 determines, for each seed point of the plurality of seed points, the current connected region of respective seed point according to the region growth rule, wherein the region growth rule needs to satisfy both a gradient amplitude growth rule and a gradient angle growth rule simultaneously.

Here, for each of the multiple seed points, the region growth rule determination unit 1003 selects a seed point as an initial growing point in an order from a large gradient amplitude to a small gradient amplitude; for each initial growing point, the region growth rule determination unit 1003 adds other seed points that satisfy the region growth rule to the initial connected region of the seed point as the current connected region.

The pixels in the connected region have similar gradient directions and similar gradient amplitudes, the present disclosure provides a connected region growth rule that needs to satisfy both the gradient amplitude growth rule and the gradient angle growth rule simultaneously.

The gradient amplitude growth rule is: sorting amplitudes of neighborhood pixels of each initial growing point, and selecting the pixels whose amplitudes are ranked at a predetermined order as the pixels that satisfy the gradient amplitude growth rule. For example, the gradient amplitudes of the eight neighborhood pixels of the current growing point are sorted. If the gradient amplitude of a certain one of the eight neighborhood pixels is ranked in the top four, the pixel satisfies the gradient amplitude growth rule. It should be recognized that the aforesaid predetermined rank is only an example, and the aforesaid predetermined rank can be set as required.

The gradient angle growth rule is: selecting pixels that are not added to the current connected region as pixels to be determined, selecting pixels to be determined an absolute value of a difference between whose gradient angle and the gradient angle of the current connected region is less than a predetermined value as pixels that satisfy the gradient angle growth rule. For example, the image gradient angle growth rule is the same as the LSD (Line Segment Detector) straight line extraction algorithm, that is, if the absolute value of the difference between the gradient angle of the pixel to be determined and the gradient angle of the growing region is less than 22.5 degrees, it satisfies the gradient angle growth rule. It should be recognized that the aforesaid gradient angle difference is just an example, and the aforesaid gradient angle difference can be set as required.

Further, after determining the current connected region of respective seed point according to the region growth rule, the region version unit 1004 may perform region revision on the current connected region, and the region revision comprises: comparing a proportion of pixels within the connected region to pixels of its circumscribed rectangle with a set proportion threshold; and if the proportion of pixels within the connected region to pixels of its circumscribed rectangle is less than the set proportion threshold, the region growth is restarted by reducing an image gradient angle threshold or reducing a side length of the circumscribed rectangle.

Next, the line segment fitting unit 1005 performs line segment fitting on line segments in the current connected region of respective seed point. That is, first, the effective pixels having non-maximum image gradient being suppressed are utilized to fit the lines to which the line segments belong, and then the two endpoints of the fitted line segments are determined in connection with the image coordinate information of the pixels in the connected region, so as to determine the fitted line segments.

After determining the fitted line segments, the determination unit 1006 may determine whether the line segment fitting result is valid by calculating the number of false line segments in the image, that is, after line segment fitting is performed on the line segments within the current connected region of the respective seed point, the following steps are further comprised: calculating the number of false line segments in the image, and selecting a line segment fitting result in which number of false line segments is less than a preset threshold as a valid result.

For example, the following method can be adopted to verify whether the line segment detection result is valid. For a line segment fitted by n seed points, the distance from each seed point to the line segment is calculated, and the number of seed point pixels whose distance is less than 1.5 is counted, and then number of false line segments (NFA) in the image is calculated based on the line segment. Details are omitted for the method for determining the NFA mentioned above.

Hereinafter, a line segment detection device according to an embodiment of the present disclosure will be described with reference to FIG. 5. FIG. 5 is a schematic diagram of a line segment detection device according to an embodiment of the present disclosure. Since the function of the line segment detection device of this embodiment is the same as the details of the method described above with reference to FIG. 1, detailed description of the same content is omitted here for simplicity.

As shown in FIG. 5, the line segment detection device 1100 comprises a memory 1101 configured to store computer-readable instructions; and a processor 1102 configured to process the computer-readable instructions stored in the memory, wherein the following functions are implemented when the processor processes the computer-readable instructions: extracting image features of an image to be processed; determining a plurality of seed points based on the extracted image features; for each seed point of the plurality of seed points, determining a current connected region of respective seed point according to a region growth rule, wherein the region growth rule needs to satisfy both a gradient amplitude growth rule and a gradient angle growth rule simultaneously; and performing line segment fitting on line segments within the current connected region of respective seed point.

The present disclosure also provides a computer-readable storage medium having stored thereon a computer program that, when executed by a processor, implements the following method: extracting image features of an image to be processed, the image features including an image gradient angle and an image gradient amplitude; determining a plurality of seed points based on the extracted image features; for each seed point of the plurality of seed points, determining a current connected region of respective seed point according to a region growth rule, wherein the region growth rule needs to satisfy both a gradient amplitude growth rule and a gradient angle growth rule simultaneously; and performing line segment fitting on line segments within the current connected region of respective seed point.

It will be appreciated by a person skilled in the art, aspects of the present disclosure may be illustrated and described herein in a number of patentable classes or contexts including combination of any new and useful process, machine, product or matter, or any new and useful improvement thereof. Accordingly, aspects of the present disclosure may be implemented entirely by hardware, entirely by software (including firmware, resident software, micro-code, etc.) or by combined software and hardware. The above hardware or software may generally be referred to herein as a "data block", "module", "engine", "unit," "module," or "system". Furthermore, aspects of the present disclosure may take the form of a computer program product embodied in one or more computer-readable media having computer-readable program code embodied thereon.

Each unit in the present disclosure may include a hardware, such as a microprocessor, a Digital Signal Processor (DSP), an Application Specific Integrated Circuit (ASIC), a Programmable Logic Device (PLD), a Central Processing Unit (CPU), a Graphics Processing Unit (GPU), a Field Programmable Gate Array (FPGA), this hardware may be adopted to implement part or all of respective functional block or respective unit.

Certain terminology has been used to describe embodiments of the present disclosure. For example, the terms "one embodiment", "an embodiment", and/or "some embodiments" mean that a particular feature, structure or characteristic in connection with at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as that commonly understood by one of ordinary skill in the art to which the present disclosure belongs. It will be further understood that terms, such as those defined in commonly used dictionaries, should be interpreted as having the meaning that is consistent with their meaning in the context of the relevant art, and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the novel teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the embodiments of the present disclosure and other embodiments are intended to be included in the scope of the attached claims. The present disclosure is defined by the claims and their equivalents.

What is claimed is:

1. A line segment detection method, comprising:
   extracting image features of an image to be processed, the image features including an image gradient angle and an image gradient amplitude;
   determining a plurality of seed points based on the extracted image features;
   for each seed point of the plurality of seed points, determining a current connected region of respective seed point according to a region growth rule, wherein the region growth rule needs to satisfy both a gradient amplitude growth rule and a gradient angle growth rule simultaneously; and
   performing line segment fitting on line segments within the current connected region of respective seed point,
   said extracting image features of an image to be processed comprises:
   when the image is a chromatic image, extracting the gradient angle value and the gradient amplitude value as the image features based on an image gradient fusion method; or subjecting the chromatic image to a grayscale processing, and extracting the gradient angle value and the gradient amplitude value after the grayscale processing is performed as the image features;
   when the image is a grayscale image, extracting the gradient angle value and the gradient amplitude value of the image as the image features,
   wherein the image gradient fusion method is:
   performing grayscale processing on the chromatic image to extract a grayscale channel gradient amplitude after grayscale processing is performed;
   extracting amplitudes of a red channel gradient, a green channel gradient, and a blue channel gradient of the chromatic image;
   taking a maximum value from amplitudes of among the red channel gradient, the green channel gradient, the blue channel gradient of the chromatic image, and the grayscale channel gradient amplitude as a gradient amplitude of the fused chromatic image; and
   extracting a gradient angle corresponding to the gradient amplitude of the fused chromatic image as a gradient angle of the fused chromatic image.

2. The method according to claim 1, wherein determining a plurality of seed points based on the extracted image features comprises:
   determining a plurality of seed points based on the extracted image features through non-maximum suppression and threshold filtering.

3. The method according to claim 2, wherein the method of determining a plurality of seed points through non-maximum suppression is as follows:

$$G_{NMS}(x, y) = \begin{cases} G(x, y), & G(x, y) > G_\theta(x, y)_1 \text{ and } G(x, y) > G_\theta(x, y)_2 \\ 0, & \text{Other cases} \end{cases}$$

where $G(x, y)$ represents the image gradient amplitude of a pixel $(x, y)$, $G_\theta(x, y)_1$ and $G_\theta(x, y)_2$ respectively represent the gradient amplitudes of two pixels adjacent to the current pixel in an image gradient direction, $G_{NMS}(x, y)$ represents an effective pixel gradient after the image gradient is subjected to non-maximum suppression.

4. The method according to claim 2, wherein determining a plurality of seed points through threshold filtering comprises:
   taking a difference between a statistical average value of the amplitude of the image gradient and a standard deviation of the image gradient at a preset multiple as a threshold, taking all effective pixel dots of which an effective pixel gradient after the image gradient is subjected to non-maximum suppression is greater than the threshold as seed points for growth of the connected region, meanwhile taking all pixel dots of which gradient amplitude is greater than a sum of the statistical average value of the amplitude of the image gradient and the standard deviation of the image gradient as seed points for growth of the connected region.

5. The method according to claim 1, wherein for each seed point of the plurality of seed points, determining a current connected region of respective seed point according to a region growth rule comprises:
   selecting a seed point as an initial growing point in an order from a large gradient amplitude to a small gradient amplitude;
   for each initial growing point, adding other seed points that satisfy the region growth rule into an initial connected region of the seed point as the current connected region.

6. The method according to claim 5, wherein the gradient amplitude growth rule is:
   sorting gradient amplitudes of neighborhood pixels of each initial growing point, and selecting the pixels whose amplitudes are ranked at a predetermined order as the pixels that satisfy the gradient amplitude growth rule.

7. The method according to claim 5, wherein the gradient angle growth rule is:
   taking pixels that are not added into the current connected region as pixels to be determined, selecting pixels to be determined, an absolute value of a difference between whose gradient angle and the gradient angle of the current connected region is less than a predetermined value, as pixels that satisfy the gradient angle growth rule.

8. The method of claim 1, further comprising:
after determining the current connected region of respective seed point according to the region growth rule, performing region revision on the current connected region, the region revision including:
comparing a proportion of pixels within the current connected region to pixels of its circumscribed rectangle with a set proportion threshold;
when the proportion of pixels within the current connected region to pixels of its circumscribed rectangle is less than the set proportion threshold, restarting region growth by reducing an image gradient angle threshold or reducing a length of the circumscribed rectangle.

9. The method according to claim 1, wherein performing line segment fitting on line segments within the current connected region of respective seed point comprises:
performing fitting of lines to which the line segments belong by exerting non-maximum suppression to pixels within the current connected region; and
determining two endpoints of the fitted line segments with reference to image coordinate information of the pixels within the current connected region.

10. The method according to claim 9, wherein after performing line segment fitting on line segments within the current connected region of respective seed point, the method further comprises the following steps:
calculating a number of false line segments in the image, and selecting a line segment detection result in which the number of false line segments is less than a preset threshold, as a valid result.

11. The method according to claim 10, wherein the number of false line segments NFA in the image is calculated by the following method:

$$NFA(L, x) = (M \times N)^2 \sum_{i=x}^{n} \binom{n}{i} p^i (1-p)^{n-i}$$

wherein L represents a line segment fitted by n seed points, a distance from at least x seed points to the fitted line segment L is less than a predetermined threshold, $(M \times N)^2$ represents the number of potential line segments in an image of a $(M \times N)$ size, and a probability p represents a probability that a seed point is not a line segment fitting error point.

12. The method of claim 10, wherein the preset threshold is a maximum number of false line segments allowed in an image.

13. A computer-readable storage medium having stored thereon a computer program that, when executed by a processor, implements the following method:
extracting image features of an image to be processed, the image features including an image gradient angle and an image gradient amplitude;
determining a plurality of seed points based on the extracted image features;
for each seed point of the plurality of seed points, determining a current connected region of respective seed point according to a region growth rule, wherein the region growth rule needs to satisfy both a gradient amplitude growth rule and a gradient angle growth rule simultaneously; and
performing line segment fitting on line segments within the current connected region of respective seed point,
said extracting image features of an image to be processed comprises:
when the image is a chromatic image, extracting the gradient angle value and the gradient amplitude value as the image features based on an image gradient fusion method; or subjecting the chromatic image to a grayscale processing, and extracting the gradient angle value and the gradient amplitude value after the grayscale processing is performed as the image features;
when the image is a grayscale image, extracting the gradient angle value and the gradient amplitude value of the image as the image features,
wherein the image gradient fusion method is:
performing grayscale processing on the chromatic image to extract a grayscale channel gradient amplitude after grayscale processing is performed;
extracting amplitudes of a red channel gradient, a green channel gradient, and a blue channel gradient of the chromatic image;
taking a maximum value from amplitudes of among the red channel gradient, the green channel gradient, the blue channel gradient of the chromatic image, and the grayscale channel gradient amplitude as a gradient amplitude of the fused chromatic image; and
extracting a gradient angle corresponding to the gradient amplitude of the fused chromatic image as a gradient angle of the fused chromatic image.

14. A line segment detection apparatus, comprising:
an image feature extraction circuit configured to extract image features of an image to be processed, the image features including an image gradient angle and an image gradient amplitude;
a seed point determination circuit configured to determine a plurality of seed points based on the extracted image features;
a region growth rule determination circuit configured to determine, for each seed point of the plurality of seed points, a current connected region of respective seed point according to a region growth rule, wherein the region growth rule needs to satisfy both a gradient amplitude growth rule and a gradient angle growth rule simultaneously; and
a line segment fitting circuit configured to perform line segment fitting on line segments within the current connected region of respective seed point,
said image feature extraction circuit is further configured to,
when the image is a chromatic image, extracting the gradient angle value and the gradient amplitude value as the image features based on an image gradient fusion method; or subjecting the chromatic image to a grayscale processing, and extracting the gradient angle value and the gradient amplitude value after the grayscale processing is performed as the image features;
when the image is a grayscale image, extracting the gradient angle value and the gradient amplitude value of the image as the image features,
wherein the image gradient fusion method is:
performing grayscale processing on the chromatic image to extract a grayscale channel gradient amplitude after grayscale processing is performed;

extracting amplitudes of a red channel gradient, a green channel gradient, and a blue channel gradient of the chromatic image;

taking a maximum value from among amplitudes of the red channel gradient, the green channel gradient, the blue channel gradient of the chromatic image, and the grayscale channel gradient amplitude, as a gradient amplitude of a fused chromatic image; and extracting a gradient angle corresponding to the gradient amplitude of the fused chromatic image as a gradient angle of the fused chromatic image.

15. The apparatus according to claim 14, wherein said seed point determination circuit is further configured to:

determining a plurality of seed points based on the extracted image features through non-maximum suppression and threshold filtering.

16. A line segment detection device, comprising:

a memory, configured to store computer-readable instructions; and a processor, configured to process the computer-readable instructions stored in the memory, wherein the method of claim 1 is executed when the processor processes the computer-readable instructions.

* * * * *